July 22, 1924.
H. G. MOORE
1,502,264
INTERNAL COMBUSTION ENGINE
Original Filed Dec. 10, 1921   3 Sheets-Sheet 2
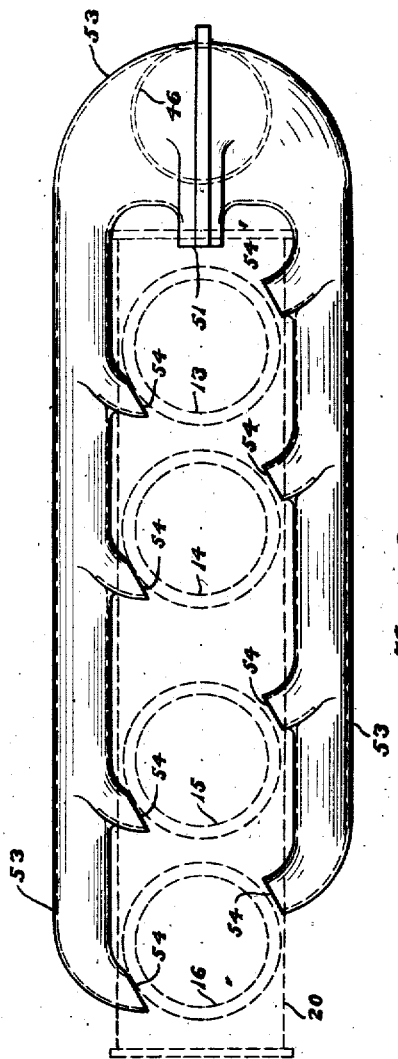
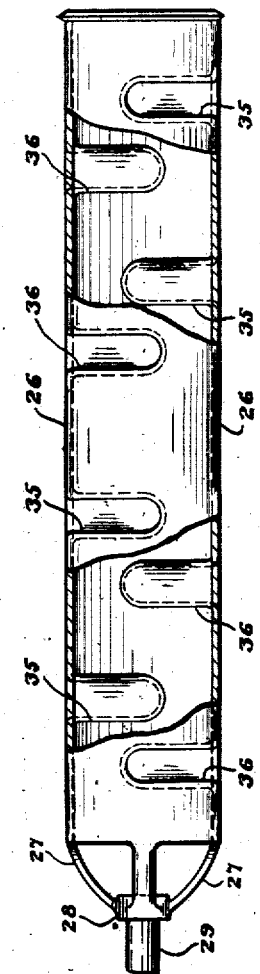
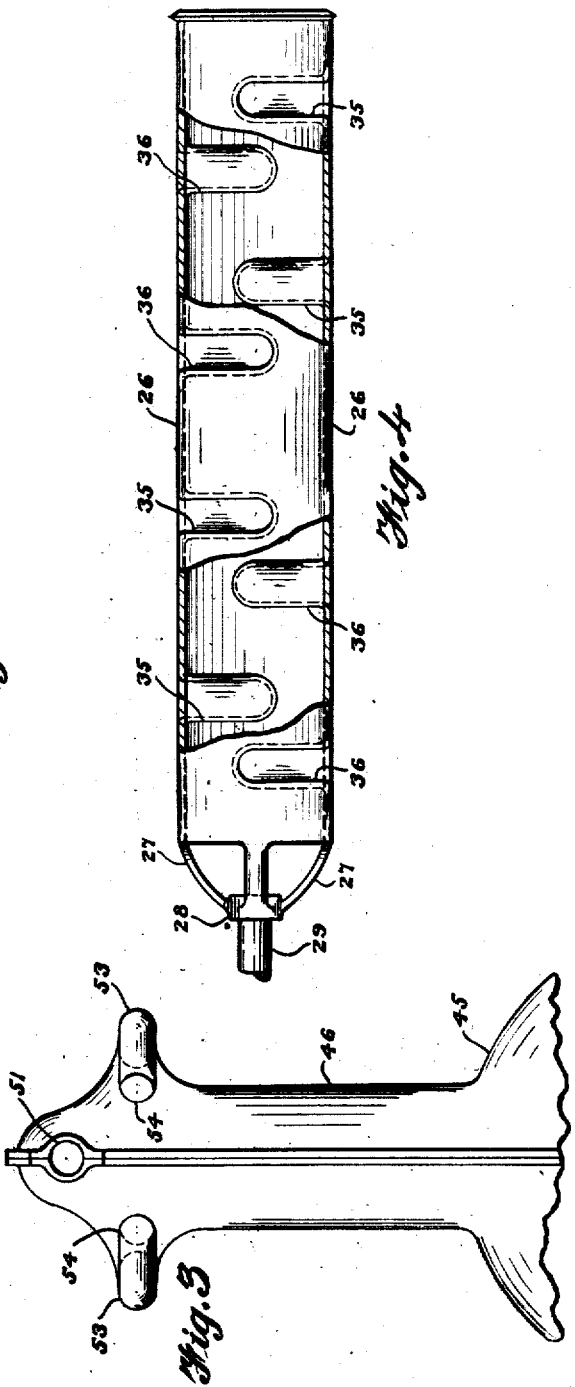

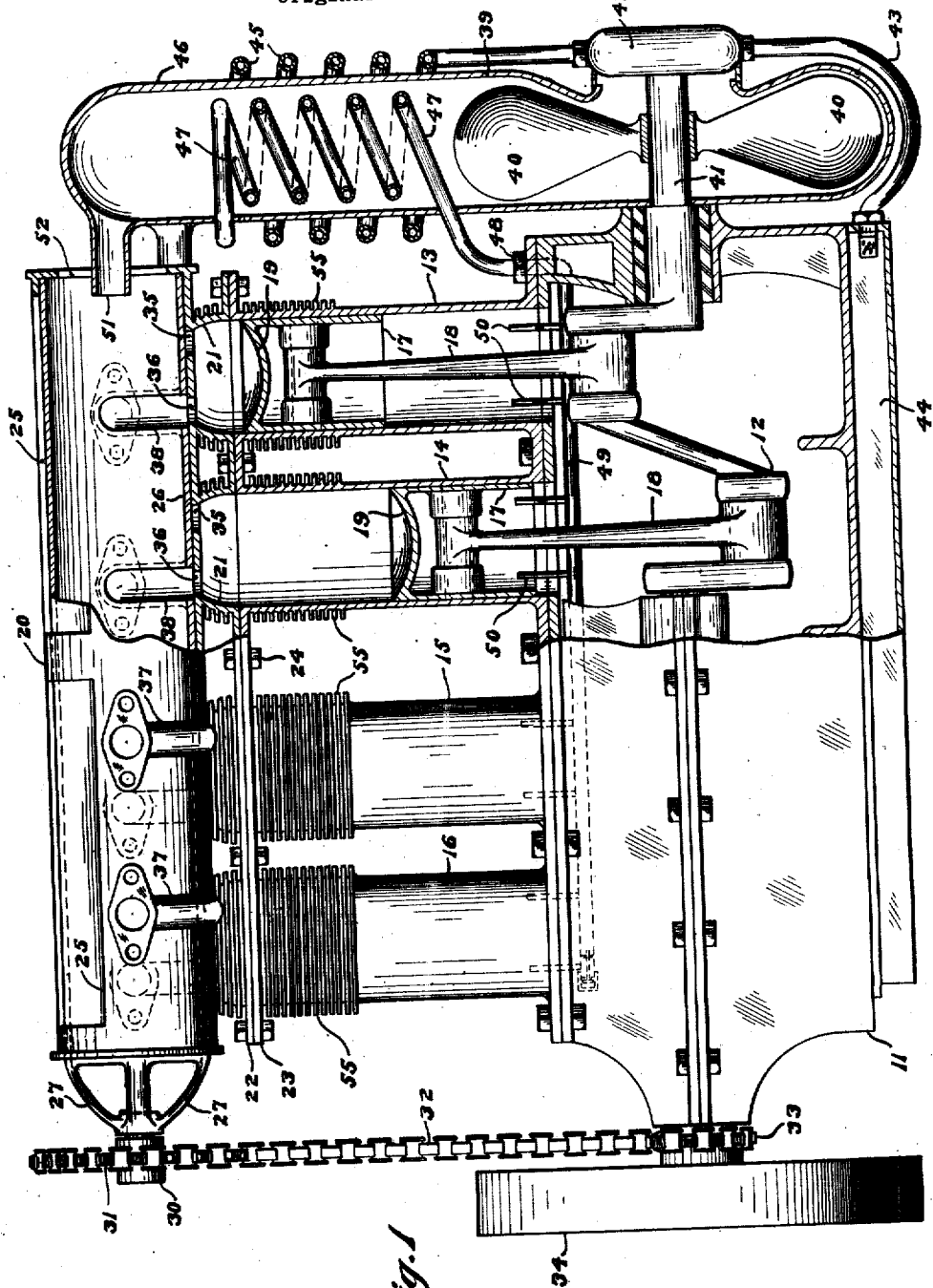

July 22, 1924.
H. G. MOORE
INTERNAL COMBUSTION ENGINE
Original Filed Dec. 10, 1921      3 Sheets-Sheet 3
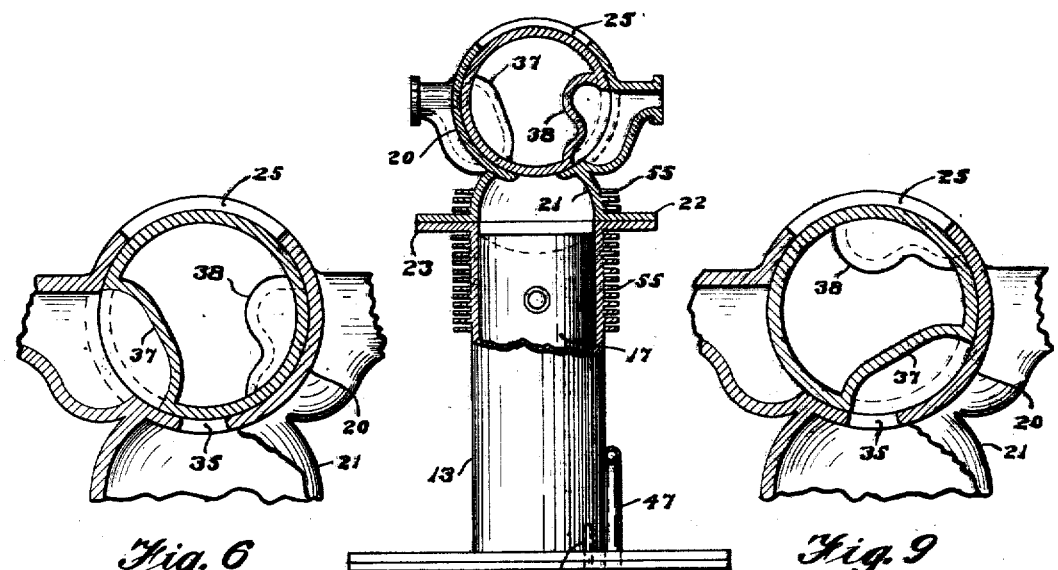
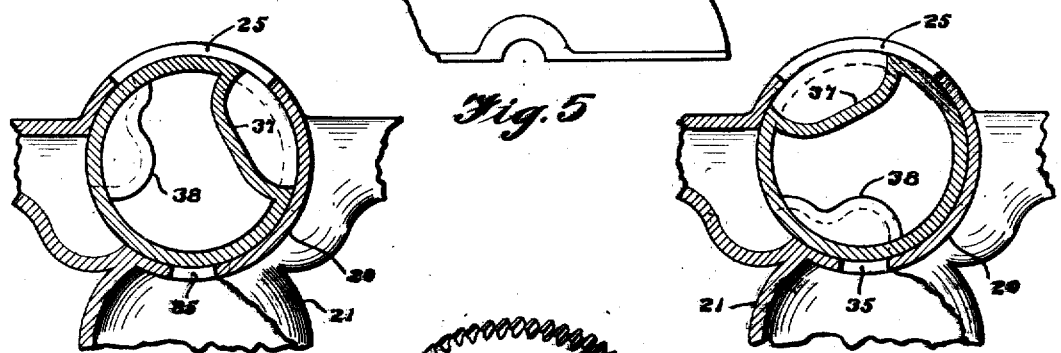

Patented July 22, 1924.

1,502,264

UNITED STATES PATENT OFFICE.

HARRY G. MOORE, OF PHILADELPHIA, PENNSYLVANIA.

INTERNAL-COMBUSTION ENGINE.

Application filed December 10, 1921. Serial No. 521,490. Renewed June 9, 1924.

*To all whom it may concern:*

Be it known that I, HARRY G. MOORE, a citizen of the United States, residing at Philadelphia, in the county of Philadelphia and State of Pennsylvania, have invented new and useful Improvements in Internal-Combustion Engines, of which the following is a specification.

This invention relates to internal combustion engines and it has more particular reference to engines or motors of any multiplicity of cylinders of the air-oil cooled piston or rotary valve type, the primary object being to provide a novel form of valve mechanism whereby the efficiency of such motors are considerably increased and the economic consumption of fuels assured.

A further object consists in the provision of a novel form of lubricating system of the forced feed type which is air cooled.

A still further object aimed at by this invention is the provision of an internal combustion engine or motor having a blower with ram's-horn connections which effectively cools the rotary valve mechanism and cylinder heads.

Another object is the use of an elliptical gear or gears of the silent chain type, or elliptical spur gears meshed together to provide means for the quick or instant opening and closing of the rotary valve ports.

With the foregoing fundamental and other objects in view as will later on be more apparent from the following description, my invention consists essentially in the novel features of construction, combinations and arrangements of parts hereinafter fully described, and more specifically defined by the appended claims.

In the further disclosure of the invention reference is to be had to the accompanying sheets of explanatory drawings constituting a part of this specification, and in which like characters of reference designate the same or corresponding parts in all the views.

Figure 1 is a side elevation partly broken away or in section to better disclose the underlying structure.

Figure 2 is a top plan view showing the form and position of the ram's-horn manifolds relative to the cylinder heads, the latter being shown in dotted outline for the sake of clearness.

Figure 3 is a detail end view of a fragmentary portion of the blower housing and ram's-horn manifolds.

Figure 4 is a detail plan view of the rotary valve partly broken away or in section at places and illustrating the cored-out inlet and exhaust pockets therein.

Figure 5 is a fragmentary end elevation of one of the engine or motor cylinders with the upper part thereof in section to disclose the underlying structure.

Figure 6 is a fragmentary sectional view through the rotary valve and cylinder head exemplifying the firing position of cylinder number one or that next the blower in Figure 1.

Figure 7 is a like view of the position of said valve of cylinder number three at the same time.

Figure 8 is a corresponding view relating to cylinder number four at the same time.

Figure 9 is a similar view with reference to cylinder number two at the same time; and, Figure 10 is a perspective view of an elliptical gear hereinafter more particularly referred to.

Referring more particularly to the drawings which illustrate the application of my invention to a multiple-cylinder internal combustion engine comprising a crank case 11 in which is journaled the crank shaft 12, said crank case supporting the cylinders 13, 14, 15, 16 in which are pistons 17 operated by connecting rods 18 from the aforesaid crank shaft 12 in the well known way. The several piston heads 19 are preferably made concavo-convex in cross section for the purpose later on explained.

In accordance with my invention I construct a cylindric valve casing 20 having inverted concavo-convex spaced projections that constitute the cylinder heads 21 and all of which has a common holding-down flange 22 for connection upon the correspondingly shaped flange 23 about the upper ends of the aforesaid cylinders 13, 14, 15, 16 by means of bolts or the like 24.

Longitudinally of the upper side of the valve casing 20 there is provided aligning elongated slots 25 for the purpose later on explained and arranged for rotation therein is the open-ended cylindric valve 26 provided at its outer end with arms 27 having a centrally located bearing boss 28 in which is screw threaded a shaft 29 integral with or secured in the hub 30 of an elliptic gear. Valve 25 may be lubricated by oil cups (not shown) secured on and piercing the valve casing 20.

This valve 26 is conveniently arranged to be rotated by means of an elliptic gear 31 secured on the outer end of the valve spindle or shaft 29 and it is driven by a silent chain 32 from a gear 33 on the crank-shaft 12 between the crank case 11 and the flywheel 34 so that provision is made for distinct rotating speeds of the valve 26 to ensure the quick or instant opening and closing of the inlet and exhaust ports in each cylinder; or in other words, it ensures the proper timing of said valve 26 in a four cycle internal combustion engine or motor in multiples of two, four, six, eight, twelve or more cylinders. Gear 33 is a circular gear but is mounted eccentrically on shaft 29 so that as the slack in the chain is caused by the rotation of elliptic gear 31, this slack is taken up by the "high" part of the eccentric gear 33. Inlet and exhaust ports 35, 36 are provided in the valve casing or cylinder 20 and the valve 26 is formed with a series of inset semi-elliptic pockets 37 and a like number of undulating pockets 38, the former being adapted for registration with the inlet ports 35 and the latter with the exhaust ports 36 as later on explained.

Suitably mounted at that end of the engine remote from the flywheel 34 is a blower casing 39 of appropriate shape to house the fan 40 that is fixed on the extended end 41 of the crank shaft and also connecting with the oil pump 42 of approved type and pattern. Connected into the suction end of the oil pump 42 is a pipe 43 leading into the oil reservoir 44 of the crank case 11, whereas a coiled pipe 45 leading from the discharge is spirally wound about the outer upper part or neck 46 of the blower casing 39, its upper or free end entering thereinto and being spirally wound downwards to provide an inner coil 47 that is attached to the top of the crank case 11 by a gland nut at 48. Extending longitudinally through the upper part of the crank case 11 from the aforesaid gland nut 48 is a horizontally disposed pipe 49 having vertical open-ended branches 50 projecting upwards within the cylinders 13, 14, 15 and 16. Thus it will be readily seen that the warm oil is drawn from the oil reservoir 44 and forced through the two coils 45, 47 it will be thoroughly cooled before returning to the distributing pipe 49 and branches or nozzles 50 for ejection into the cylinders 13, 14, 15 and 16. It is also to be here observed that the concave inner surface of the piston heads 19 effectively ensures the proper deflection of the oil as it shoots up from the branches or nozzles 50 thereover to properly cool the same after each explosion.

Leading from the upper end of the aforesaid blower casing neck 46 is a branch or nozzle 51 that projects into the open end 52 of the valve 26 whilst said neck 46 is also provided with opposed ram's-horn manifolds 53 having outlets 54 directed inwards towards the cylinder heads 21 and the upper cooling vanes 55 as will be clearly understood from Figure 2 of the drawings, the outlets being all of the same size. Spragg 54' directs air to cylinders 13, 14 and 15 whilst cylinder 16 has no spragg. It is also to be remarked that the branch or nozzle 51 delivers a steady stream of cool air axially direct through the rotary cylindric valve 26 thereby maintaining same cool.

From the foregoing description it will be clearly seen that the rotary or cylindric valve 26 with its intake pockets 37 on one side thereof and its exhaust pockets 38 on the other side is a radical departure from the conventional and well known mechanism inasmuch as said intake and exhaust pockets 37, 38 are cored out and integrally formed with the valve 26. Furthermore, these intake and exhaust pockets 37, 38 correspond with and line up in their proper rotation with the inlet and exhaust ports 35, 36 in the head 21 of each cylinder 13, 14, 15 or 16. It is also to be noted that the elongated slots or openings 25 in the valve casing 20 extend the full length of two cylinders which expedites the proper radiation of heat from the valve 26 and its intake and exhaust pockets 37, 38 as it rotates.

In conclusion it is to be clearly understood that whilst there has been shown and described one practical embodiment of my invention, the same is capable of many changes and variations, and the right is hereby reserved to include all such reasonable modifications as fairly lie within the scope of the appended claims.

Having described my invention, what I claim as new and desire to secure by Letters Patent is:

1. In an internal combustion engine having a multiplicity of cylinders, an enclosed crank case and a rotary cylindric valve, the combination of a blower casing, a fan in said casing driven by the engine crank shaft, an extension on said casing having an outlet nozzle directed into the aforesaid rotary valve, and a ram's-horn manifold from said extension having outlets directed about the cylinder heads whereby said cylinder heads and the rotary valve are cooled.

2. In an internal combustion engine having a multiplicity of cylinders, an enclosed crank case and a rotary cylindric valve, the combination of a blower casing, a fan in said casing driven by the engine crank shaft, an extension on said casing having an outlet nozzle directed into the aforesaid rotary valve, a ram's-horn manifold from said extension having outlets directed about the cylinder heads whereby said cylinder heads and the rotary valve are cooled, and means for circulating the lubricating oil constantly about the blower casing.

3. In an internal combustion engine having a multiplicity of cylinders, an enclosed crank case, a rotary cylindric valve, and a blower for forcing cool air through said rotary valve, the combination of a forced feed lubricating system comprising a tube coiled about the blower casing and having one end connecting into the bottom of the crank case, the other end of said tube terminating in a branch beneath the cylinders, and said branch having upwardly directed nozzles adapted to direct a spray of air cooled oil constantly against the underside of the piston heads.

4. In an internal combustion engine having a multiplicity of cylinders, an enclosed crank case and a rotary cylindric valve, the combination of a blower casing, a fan in said casing driven by the engine crank shaft, an extension on said casing having an outlet nozzle directed into the aforesaid rotary valve, a ram's-horn manifold from said extension having outlets directed about the cylinder heads whereby said cylinder heads and the rotary valve are cooled, and a circulating pump for circulating the lubricating oil constantly about the blower casing.

5. In an internal combustion engine having a multiplicity of cylinders, an enclosed crank case, a rotary cylindric valve, and a blower for forcing cool air through said rotary valve, the combination of a forced feed lubricating system comprising a tube coiled inside and outside the blower casing and having one end connecting into the bottom of the crank case, the other end of said tube terminating in a branch beneath the cylinders, and said branch having upwardly directed nozzles adapted to direct a spray of air cooled oil constantly against the underside of the piston heads.

In testimony whereof I affix my signature.

HARRY G. MOORE.